United States Patent
Diekjakobs et al.

(10) Patent No.: US 11,519,309 B2
(45) Date of Patent: Dec. 6, 2022

(54) SEPARATOR PLATE FOR AN OIL MIST SEPARATOR AND OIL MIST SEPARATOR

(71) Applicant: Hengst SE, Münster (DE)

(72) Inventors: Mathias Diekjakobs, Steinfurt (DE); Matthias Potz, Münster (DE); Andreas Dworog, Münster (DE)

(73) Assignee: HENGST SE, Münster (DE)

( * ) Notice: Subject to any disclaimer, the term of this patent is extended or adjusted under 35 U.S.C. 154(b) by 0 days.

(21) Appl. No.: 17/581,564

(22) Filed: Jan. 21, 2022

(65) Prior Publication Data

US 2022/0145787 A1    May 12, 2022

Related U.S. Application Data

(63) Continuation of application No. PCT/EP2020/068625, filed on Jul. 2, 2020.

(30) Foreign Application Priority Data

Jul. 24, 2019 (DE) ...................... 10 2019 120 023.7

(51) Int. Cl.
    *F01M 13/04* (2006.01)
    *B01D 45/14* (2006.01)
(52) U.S. Cl.
    CPC ............. *F01M 13/04* (2013.01); *B01D 45/14* (2013.01); *F01M 2013/0422* (2013.01)
(58) Field of Classification Search
    CPC . F01M 13/04; F01M 2013/0422; B01D 45/14
    See application file for complete search history.

(56) References Cited

U.S. PATENT DOCUMENTS

| 6,755,896 B2 | 6/2004 | Szepessy et al. |
| 2002/0122970 A1* | 9/2002 | Inoue .................. H01M 8/0273 264/328.8 |
| 2012/0018927 A1* | 1/2012 | Watanabe ........... B29C 45/2669 425/557 |

(Continued)

FOREIGN PATENT DOCUMENTS

| DE | 102017108168 A1 | 10/2018 |
| EP | 3034821 A1 | 6/2016 |
| WO | 2012033440 A2 | 3/2012 |

OTHER PUBLICATIONS

PCT International Search Report and Written Opinion, PCT/EP2020/068625, dated Oct. 19, 2020, 10 pages [English Language Translation of International Search Report attached].

(Continued)

*Primary Examiner* — Joseph J Dallo
*Assistant Examiner* — Kurt Philip Liethen
(74) *Attorney, Agent, or Firm* — Quarles & Brady LLP; Yakov S. Sidorin

(57) ABSTRACT

A separator plate having a receptacle for a drive shaft that defines an axis of rotation. Such plate, which includes a first annular region radially adjacent to the receptacle, a second annular region radially adjacent to the first annular region, and a third annular region radially adjacent to the second annular region, can be produced particularly easily if the second annular region has a plurality of spokes connecting the first and the third annular regions to one another and if there are flow channels extending in the axial direction between the spokes.

13 Claims, 6 Drawing Sheets

(56) References Cited

U.S. PATENT DOCUMENTS

| | | | | |
|---|---|---|---|---|
| 2016/0177890 A1* | 6/2016 | Kobayashi | ............ | F01M 13/04 |
| | | | | 55/327 |
| 2016/0288391 A1* | 10/2016 | Koga | ...................... | B29C 45/32 |
| 2017/0312963 A1* | 11/2017 | Yoshida | .............. | B29C 45/0025 |
| 2021/0046490 A1* | 2/2021 | Lüersmann | ............ | F01M 13/04 |
| 2022/0063162 A1* | 3/2022 | Ho | .......................... | B29C 45/38 |

OTHER PUBLICATIONS

Bronshtein et al., Chapter 3.3.4 Solids Bounded by Curved Surfaces, in Handbook of Mathematics, Fifth Edition, Copyright Springer-Verlag Berlin Heidelberg 2007, pp. 154-158.

* cited by examiner

SEPARATOR PLATE FOR AN OIL MIST SEPARATOR AND OIL MIST SEPARATOR

CROSS-REFERENCE TO RELATED APPLICATIONS

This application is a continuation of pending International Application No. PCT/EP2020/068625, filed on 2 Jul. 2020 and now published as WO 2021/013490 A1, which designates the United States and claims priority from German Application No. 10 2019 120 023.7 filed on 24 Jul. 2019. The disclosure of each of the above-identified applications is incorporated herein by reference.

BACKGROUND

1. Field of the Invention

The invention relates to a separator plate for an oil mist separator, and, in particular for a contraption including a separator plate with a receptacle for a drive shaft that defines an axis of rotation and is configured to separate oil from crankcase gases, as well as an oil mist separator with at least one such separator plate.

2. Description of Related Art

During the combustion process in piston engines, a small portion of the exhaust gases flows laterally past the piston or the pistons and thus from the combustion chamber into the crankshaft housing. These exhaust gases flowing past the piston are known as blow-by gases. Blow-by gases must be removed from the crankshaft housing, as they reduce the differential pressure between the combustion chamber and the crankshaft housing and thus the efficiency of the engine. Apart from that, crankshaft housings are usually not designed to withstand these higher pressures.

Accordingly, crankshaft housings are usually equipped with an outlet for these blow-by gases. However, these exhaust gases contain a significant amount of oil mist, which must not be released into the environment. Therefore, among other solutions, in U.S. Pat. No. 6,755,896 B an oil separator operating according to the centrifuge principle was proposed. The oil separator has a housing with a gas inlet, a gas outlet, and an oil outlet. The blow-by gases encounter rapidly rotating conical separator plates in the housing, which rotate axially spaced from one another with a shaft. Oil droplets accumulate on the rotating separator plates and are subsequently hurled against the housing wall. The oil flows along the housing wall to a collecting gutter that opens into the oil outlet. The thus-cleaned blow-by gases leave the housing via the gas outlet. According to U.S. Pat. No. 6,755,896 B (the disclosure of which incorporated herein by reference), the separator plates can be made of plastic. For a similarly constructed other oil mist separator, it was proposed in WO 2012/033440 A to manufacture separator plates from sheet metal. For another, similarly constructed oil mist separator, it was proposed in WO 2012/033440 A to manufacture separator plates of a metal sheet.

The subject of DE 10 2017 108 168 A (which document is incorporated herein by reference) is an oil mist separator with a rotor made of several stacked separation elements. The separation elements have spokes being attached radially to a ring, each with a longitudinal axis. The longitudinal axes of the spokes are in a common plane. In this sense, the separation element is planar. Between the spokes are ring-segment-shaped lamellae that are radially spaced from one another.

SUMMARY

The idea of the invention is based on the observation that, on the one hand, oil mist separators reduce the environmental pollution of piston engines by oil mist, but at the same time increase the overall weight of the engine, which is reflected in increased material costs and, when the piston engines are used to drive motor vehicles, worsened fuel consumption and a thus CO2 balance.

The object of the invention is to reduce the costs of piston engines and at the same time to improve the carbon footprint of manufacturing and operating piston engines.

An embodiment of the invention is a separator plate. This separator plate may serve in particular to separate oil mist, or other liquids or particles from blow-by gases or generally from gas-fluid mixtures. The separator plate has a receptacle for a drive shaft, such that the drive shaft and the separator plate have a common axis of rotation in the mounted state. While the separator plate is disk-shaped and can therefore also be referred to as a separator disk or separator sheet the separator disk or sheet is preferably not flat, but rather has at least one conical surface, so the shape of shape of such separator plate can be visualized more clearly or vividly as that somewhat resembling the shape of a simple soup plate.

The separator disk has a first ring area that adjoins radially to the receptacle and, in at least one implementation, circumscribes the receptacle of the separator disk. The inner edge, i.e. the edge of the first ring area pointing in the direction of the axis of rotation, is preferably designed as a rotary joint. For example, the contour of the edge can be discontinuously rotationally symmetrical, such that a rotational-movement-transmitting positive locking with a drive shaft is possible. This facilitates mounting the separator plate on a drive shaft of an oil mist separator.

The term "discontinuously rotationally symmetrical" as used in this disclosure denotes and refers to a broken rotational symmetry, in which a rotation of a chosen contour at a fixed angle $\alpha=360°/n$ (n>1) maps the contour onto itself.

Structurally, the first ring area of the separator disc is followed by a second ring area (in a radial direction) that adjoins the first ring area and in at least one case circumscribes such first ring area. And this second ring area is followed by a third ring area, likewise in the radial direction (which third ring area in at least one case circumscribes the second ring area). As conventionally understood, the term "radial direction" defines and denotes the direction pointing away from the axis of rotation.

The third ring area preferably extends conically at least in one section of such third ring area. The term "conical" preferably—but not necessarily—means and refers to the surface of a tapered cone, that is to say a truncated cone, respectively. The term "conical surface" is to be understood geometrically, i.e. a conical surface is formed by rotating a curve around a straight line (here—around the axis of rotation). The curve can also be a section of a straight line, which results in the already mentioned tapered cone surface which is also referred to as a truncated cone surface (cf. Bronshtein Semendyayev, Musiol, Muehlig: *Handbook of Mathematics*; 5th ed., 2007, Springer Berlin Heidelberg New York; Chapter 3.3.4).

The second ring area preferably has a plurality of spokes that connect the first and third ring areas to one another and extend radially with respect to the axis of rotation. Preferably, between every two adjacent spokes, respectively, there is a free space that during operation serves as a flow channel extending in an axial direction for the gas mixture to be separated. The separator plate can be manufactured as an injection-molded part with a particularly thin wall thickness of the third section by a favorable choice of the sprue locations (as advantageously compared to the prior art), which means that less material is needed and the manufacturing process is accelerated. In addition, the separator plate accelerates faster, such that the oil mist is reliably separated even in the phase of starting the piston engine. The environmental impact is reduced accordingly. A further effect is the contribution to weight reduction of modern piston engines, which leads to CO2 savings when used as a motor vehicle drive.

Preferably, the separator plate is an injection-molded part, i.e., it is manufactured in an injection-molding process, preferably of a plastic. The separator plate preferably has at least two sprue locations, which may for example be arranged symmetrically around the axis of rotation. The smallest possible number of sprue locations reduces manufacturing costs. The symmetrical arrangement of the sprue location makes it possible to reduce material thickness, i.e. the wall thickness (particularly, of the third ring section). Furthermore, the symmetrical arrangement counteracts the formation of weld lines that occur when flow fronts in the injection-molding process meet. However, a single sprue location can suffice. At least one sprue location is preferably defined in the first or in the second ring area, for example at least one sprue location can be arranged in the area of a spoke.

The openings in the injection mold during the injection molding process are named as sprue locations, and via these openings a plastic material (that cures later; usually a plastic melt) is pressed into the injection mold. These sprue locations can be clearly seen after demolding, at least if no polishing or other material removal on the surface takes place after demolding. In the following, the term plastic melt is used as the most common form of application, but it would also be possible to use a plastic material curing later through chemical processes. In this sense, "plastic melt" is mentioned as but a preferred embodiment in this application and is understood as a pars-pro toto for a flowable later curing (e.g. hardening) plastic material.

When manufacturing separator plates of plastic that are provided for cleaning blow-by gases, plastics must be selected that have sufficient mechanical strength and chemical resistance even at temperatures around 120° C. Therefore, thermoplastics with a comparatively high degree of polymerization are suitable, such as for example polyamides (PA66, PA6.10, . . . ), and in particular partially aromatic polyamides, i.e. polyamides with an aromatic system adjacent to the polyamide bond, such as polyphthalamide (PPA) and polyamides with aliphatic hydrocarbon chains (PA4T, PA6T, PA9T, PA10T, . . . ), as well as copolymers with such plastics (PA6T/6I, PA6T/66, PA6T/DT, PA6T/6I/66, PA66+PA6I/6T, PA6/PA6T, . . . ). As compared to other plastics, however, these plastics have rather poor flow properties, as the melt viscosity is high due to their complex chemical structure. This often leads to weld lines that worsen mechanical stability and require an increase of wall thicknesses. Just to avoid a misunderstanding, it should be made clear that the degree of polymerization, in accordance with the usual definition, as used here also indicates the number of basic building blocks per polymer molecule. In practice, of course, the mean degree of polymerization is relevant to the thermoplastics mentioned above. For the abovementioned polyamides, this figure should preferably be greater than or equal to 100, particularly preferred greater than or equal to 120, or more particularly preferred greater than or equal to 150. Since the flow behavior in the injection molding process deteriorates with increasing degree of polymerization, excessive degrees of polymerization, for example degrees of polymerization greater than 200 or at least greater than 250, should be avoided if polyamides are used.

If the spokes, which are adjacent to the respective sprue locations and/or have a sprue location, have at least one section with a tapered cross-sectional area radially of the sprue location (e.g. compared to the other spokes in total have a tapered cross-section), the complementary projections of the injection mold act as a throttle for the flow channel formed by the injection mold, which is visible as a spoke in the demolded state. (As used herein in reference to a given element such as a spoke or a web, the term "tapered cross-sectional area" defines and refers to a cross-sectional area the size of which is varied along at least a section of the length of the given element. For example, the cross-sectional area of a spoke may be tapered in a conventional way, when the spoke is made to become gradually narrower or thinner towards one end, or it may correspond to a non-gradual/non-monotonic transition in the thickness of the spoke such as that, for example, associated with a notch or step formed in the spoke.) The throttle makes it possible to simulate the flow resistance that the plastic melt has to overcome during injection molding in order to flow into the third area via a spoke further away from the sprue location (i.e. what is further referred to as a spoke remote from the sprue). Therefore, during injection molding the plastic melt is distributed more evenly over the first ring area (more precisely—over the cavity of the injection mold defining the ring area) over all spokes, and thus also on spokes further away from the sprue location. Accordingly, the pressure of the plastic melt at the end of the flow channels (which become visible later as spokes close to the sprue) is adapted at least approximately to the pressure at the radial end of the flow channels that define spokes remote from the sprue. Since the spokes (more precisely—the complementary channels of the injection mold) form the inflow into the third ring section, the flow front therefore forms at least largely uniformly in a radial direction outwardly. The stability of the separator plate is therefore not reduced or, at most, only minimally reduced by weld lines. Accordingly, the wall thickness can be advantageously reduced even further.

To simplify the language of this disclosure, no longer a distinction is made between a cavity in the injection mold and the element later formed therein. When it is stated that a plastic melt flows through a spoke, this means that the plastic melt flows through a cavity of an injection mold, where the cavity immediately before demolding the separator plate encloses such spoke. The same applies to other parts or sections of the separator plate. For the sake of simplicity, cavities of an injection mold may be referred to as parts, components or sections formed by them.

A spoke is close to the sprue if it either has a sprue or is arranged closer to a sprue than another spoke that is more remote from the sprue.

Just to avoid misinterpretations, it should be noted that the cross-sectional area extends transversely to the longitudinal direction of the respective spoke and that the sprue location(s) is (are) arranged radially inwardly of the tapered section of the spoke(s) close to the sprue.

So far, for the sake of simplicity, it has been assumed that all spokes are of the same length, but this is not necessarily the case. According to the idea of the invention, the flow resistance of the spokes (i.e. the corresponding injection molding channels) can be not only adjusted via the cross-section, but alternatively or additionally via their length, for example spokes remote from the sprue can be shorter than spokes close to the sprue, in order to adapt the pressure conditions at the end of the spokes to one another. For example, the spokes close to the sprue can extend radially and the spokes remote from the sprue can extend as curved (along a chosen curve) and/or at an angle to the radius. If a web (formed as a thickened portion of the wall thickness of the conical section) adjoins at least one spoke in a radial direction, the corresponding injection mold has a recess that reduces the flow resistance in the radial direction. Later-on in operation, the webs increase the friction between the rotating separator plate and the gas-liquid mixture (e.g. a blow-by gas) to be separated. The blow-by gas in the context of this disclosure is only an example of all gas-liquid mixtures. Setting the gas mixture in rotation is improved, so that fewer separator plates are necessary, which in turn contributes to savings in manufacturing costs and weight. This works particularly well if the webs serve as spacers between adjacent separator plates, i.e. in one implementation of the oil mist separator the underside of an upper separator plate may rest on at least two (preferably three or more) webs, wherein the webs are formed on the top side of a lower separator plate. Alternatively or additionally, the webs could of course also be formed on the underside of the upper separator plate. However, the webs can be problematic with regard to the formation of weld lines, because the plastic melt in the webs advances the rest of the flow front.

It has proven to be particularly advantageous if therefore the height h of the webs (by which height the webs protrude beyond the wall between two webs) is chosen as small as possible. For example, the height of the webs h can at least approximately correspond to the height of the elsewhere prevailing thickness d of a wall of the conical section between the webs (i.e. h is approximately equal to d; e.g. $h=d\pm 20\%$, preferably $d=h\pm 10\%$, particularly preferably $h=d\pm 5\%$). Consequently, the thickness of the separator plate in the web preferably corresponds at least approximately to twice the thickness d of the wall thickness between the webs. The height h of the webs is therefore the additional wall thickness with/at which the respective webs protrude above the area of the separator plate lying between the webs. Due to the aforementioned relationships between the web height h and the thickness d of the wall lying between the webs, the advance of the flow front is effectively restricted. The preferred web height h is less than or equal to 0.3 mm ($h \leq 0.3$ mm), particularly preferably less than or equal to 0.25 mm ($h \leq 0.25$ mm) or even less than or equal to 0.2 mm ($h \leq 0.2$ mm), depending on the specifics of the particular implementation. The reasonable lower limit depends, among other factors, on the viscosity of the liquid to be separated. For engine oils currently used in related art, a lower limit of 0.1 mm, and eventually down to 0.05 mm seems to be given. If a significant number of particles have to be expected in the mixture to be separated, the expected maximum particle diameter can be a reasonable lower limit. This enables the particles to pass the gap at least essentially unhindered.

Since the web height determines the height of the resulting gap when the webs are used as spacers between the plates, lower web heights lead to a height reduction of the entire stack of plates and thus to a reduction in construction space. Furthermore, it has been found out, that a small gap height has a particularly advantageous effect on the separation of finest oil droplets, i.e. it promotes the separation of finest oil droplets compared to a larger gap.

In addition or alternatively to the webs, further spacers can also be provided at the separator plates.

Particularly preferably, at least two adjacent spokes are each adjoined at least indirectly by a web in the radial direction, wherein at least one radially extending intermediate web is between the two webs. The intermediate web also enables the area between the webs to be filled in a particularly even manner during injection molding. The critical weld lines are further reduced and the wall thickness can be reduced accordingly. Particularly preferred, the spokes, or at least some spokes, open into a ring or one or more ring segments which have an increased wall thickness compared to the radially outer region of the third section. By this way, the corresponding annular cavity of the injection mold enables a particularly even filling of the radially outward annular gap of the injection mold. In particular, the ring or the at least one ring segment can be connected to one or more intermediate webs. The corresponding annular cavity of the injection mold then feeds the recess for the intermediate webs, i.e. the viscosity-related pressure drop of the flowing plastic on the way to the corresponding "intermediate web" (meaning the recess surrounding the intermediate web) is reduced and the recesses are evenly filled with plastic. All this in turn serves to avoid weld lines, which enables a further reduction in the wall thickness and thus a cost and weight saving.

For the same reason, preferably the cross-sectional areas of the at least one web and/or of the at least one intermediate web taper in the radial direction.

The cross-sectional area Az(r) of the at least one intermediate web as a function of the radius is preferably greater than at least one of the respective cross-sectional areas As(r) of the two webs enclosing the intermediate web at the given radius, i.e. Az(r)>As(r), preferably Az(r)>1.2 As(r), particularly preferably Az(r)>1.5 As(r) or Az(r)>2 As(r). Thereby, the flow resistance through the recess corresponding to the intermediate web further away from the spokes decreases, which overall leads to a more uniform flow front. The quality of the separator plate is further increased, i.e. weld lines are further reduced. As usual, the radius indicates the distance from the axis of rotation.

Particularly preferred, at least one web has a cross-sectional area which first decreases in the radial direction and then increases again. The complementary projection of the injection mold reduces the flow of plastic into the recess that will later form the web, i.e. it acts as a throttle and increases the part of the plastic flowing in the circumferential direction, e.g. in the direction of a recess of the intermediate web, the weld lines are further reduced. If a plurality of intermediate webs is arranged between two adjacent webs, the intermediate webs close to the chosen web can also have a cross-sectional area which is first decreased in radial direction and then increases again.

The third section preferably consists at least essentially of a conical ring segment, with an at least largely constant wall thickness, except of the optional webs and optional intermediate webs as well as the optional ring described above for distributing the plastic in the circumferential direction. Particularly preferred is the situation when the wall thickness of the third ring section between two adjacent webs and/or between a web and an adjacent intermediate web in the circumferential direction and/or in the radial direction is substantially constant, that is maintained within 10%. The preferred mean wall thickness dm is less than or equal to 0.3 mm (dm≤0.3 mm), particularly preferably less than or equal to 0.25 mm (dm≤0.25 mm) or less than or equal to 0.2 mm (dm 0.2 mm).

To further improve the separation performance, a surface texturing, e.g. in the form of micro recesses or elevations may be provided. Such a texturing can be achieved particularly well in the case of the preferred low wall thicknesses, since with these an advantageous rapid cooling of the edge layer is achieved.

The disclosed separator plate is preferably used in an oil mist separator, e.g. for blow-by gases from piston engines application, but the disclosed principle is not limited to this application of the invention. The disclosed separator plate can also be used in other technical areas in which gas-liquid phases are separated. The corresponding separator typically has a housing which has at least one gas inlet, at least one gas outlet and at least one oil outlet. At least one separator plate on a rotationally driven shaft is arranged in the housing. Preferably, several separator plates are arranged one above the other on the shaft.

For example, at least two separator plates may be seated on the rotationally driven shaft in the housing. The at least two separator plates are preferably arranged one above the other (i.e. stacked in the axial direction). A gap can be formed in the first ring area between the at least two separator plates. The thickness of the package formed by the two adjacent separator plates, i.e. the sum of the thicknesses of the respective separator plates (including the gap formed between them) is preferably less than or equal to 1 mm, preferred less than or equal to 0.8 mm, particularly preferred less than or equal to 0.6 mm. The lowest possible thickness is only limited by the material strength of the separator plate and the viscosity of the oil to be separated. Currently, 0.25 mm is regarded as reasonable lower limit for the thickness of the package.

The gap between the two separator plates formed in the first ring area preferably has a height of less than or equal to 0.3 mm, particularly preferred less than or equal to 0.2 mm. A gap of about 0.05 mm is assumed as the lower limit for the gap for oil mist separators. However, this lower limit depends on the viscosity of the oil to be separated. The thinner the fluid to be separated, the smaller the gap can be. If also particles are contained in the mixture to be separated, e.g. soot or the like, the gap thickness should preferably not be smaller than the expected particle diameter.

BRIEF DESCRIPTION OF THE DRAWINGS

In the following, the invention will be described by way of non-limiting examples of embodiments, without limitation of the general inventive concept, and with reference to the corresponding drawings, of which.

Figure 1:
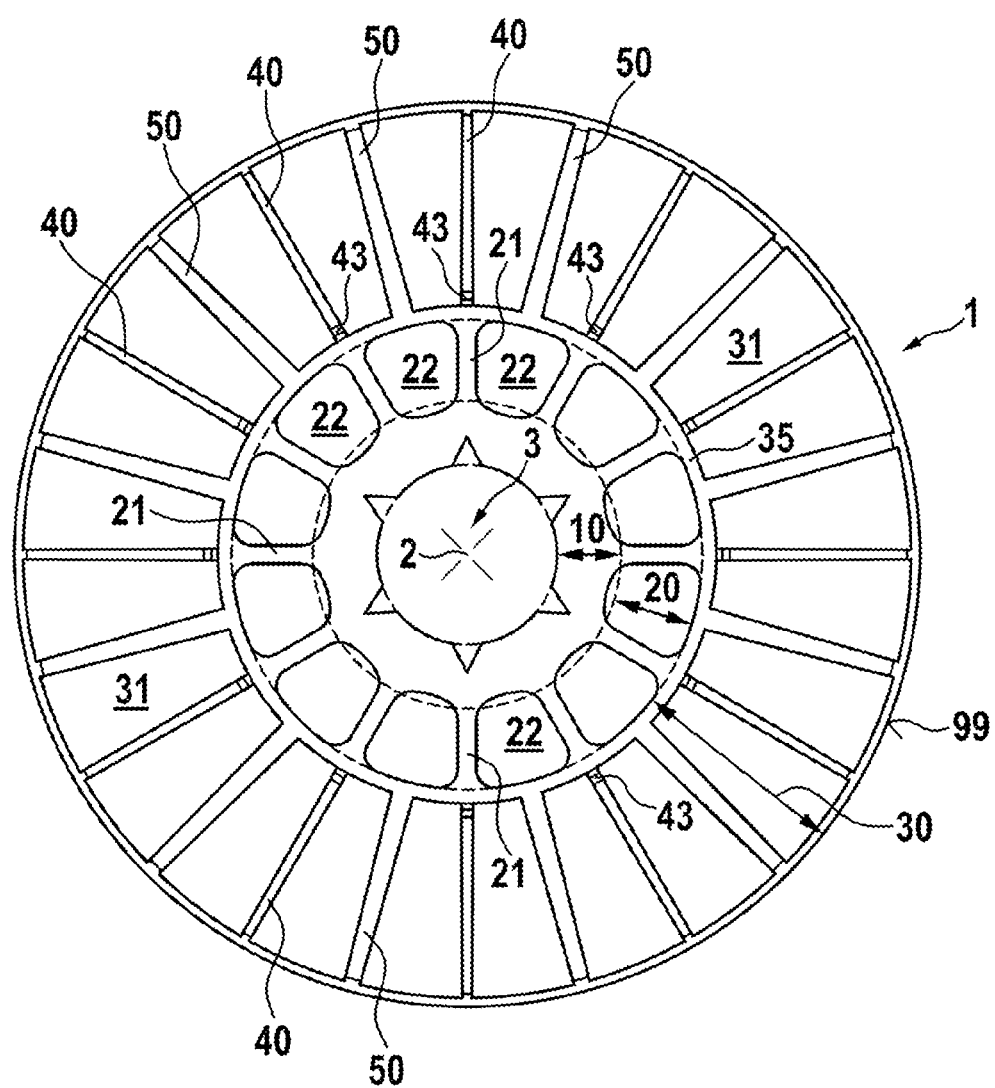
FIG. 1 shows a plan view of an embodiment of a separator plate.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

FIG. 1 shows a plan view of an embodiment of a separator plate 1. As shown, the separator plate 1 has three ring-shaped areas. The first ring area 10 is limited radially on an inward side by a receptacle 3, dimensioned to accept a drive shaft (not shown). The common axis of rotation of the shaft and the separator plate 1 runs orthogonally to the drawing plane and is identified by the reference sign 2. The first ring area 10 merges radially on the outward side with a second ring area 20, which is essentially formed by preferably spatially-evenly arranged spokes 21 and the openings 22 defined by and located between the immediately-neighboring spokes 21. Such openings 22 define the flow channels for the oil mist. The outer ends of the spokes 21 are at a ring 35 that identifies the inner edge of the third ring area 30. The third ring area 30 extends up to the edge 99 of the separator plate 1, which terminates the outer portion of the plate 1 radially. The limits between the ring areas 10, 20, 30 are drawn as dashed lines. The respective adjacent ring areas 10 and 20, as well as the ring areas 20 and 30 are sequentially adjoining one another, preferably without a transition. (In the example of Figure as shown, the ring area 20 is substantially circumscribing the ring area 10, while the ring area 30 I substantially circumscribing the ring area 20.) The corresponding radial extension of each of the ring areas is shown by the corresponding double arrow. The third ring area 30 includes sections 31 having substantially conical surfaces (which makes sections 31 to be conical sections of the third ring area), sections 31 adjoining the ring 35, with the axis of rotation 2 defining axes of the corresponding cones (cf. FIG. 2 and FIG. 3).

The receptacle 3 dimensioned to accept the shaft is a through-hole 3 centrally-located in the embodiment 1. The contour of the through-hole 3 preferably has a discontinuous rotational symmetry, as shown, such that no imbalance arises, but a torque-transmitting positive locking of the separator plate 1 with a complementary shaft (when cooperated with the plate 1) is possible. Other possibilities for torque-transmission, such as a frictional connection between the shaft and/or stacked separator plates 1 are also possible.

The example shown has a plurality of webs 40 on its top side, each of which is preferably arranged as the radial extension of a corresponding spoke 21, when regarded in plan view. Optionally or alternatively, at least one intermediate web 50, respectively, is arranged between each of the two neighboring webs 40. The webs 40 and the intermediate webs 50 are elevations in the top side of the third ring area 30. Apart from having such elevations, the third ring area 30 preferably at least substantially has the surface of a cone segment (e.g., of a truncated cone). In the assembled state of the separator plate 1, the webs 40 and the intermediate bars 50 serve as spacers that contact and rest on an underside of another shown separator plate 1 when such additional separator plate 1 is stacked on the shaft above the given separator plate 1.

Figure 2:
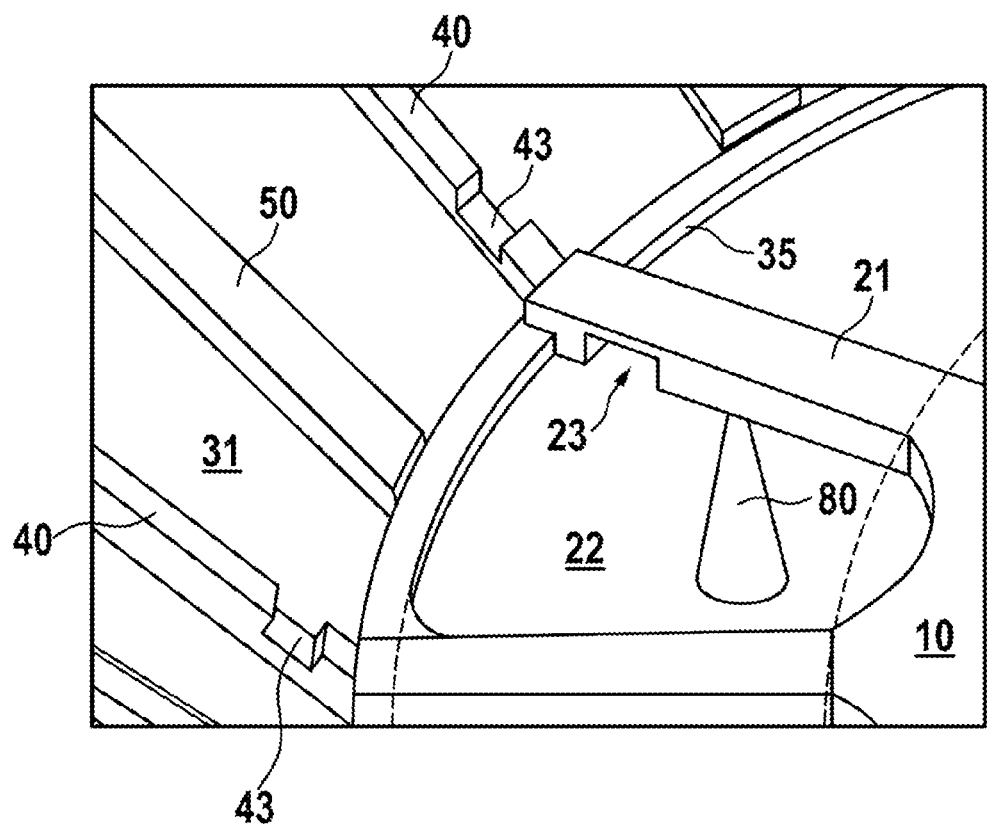
FIG. 2 illustrates a detail of the embodiment of FIG. 1.

FIG. 2 shows a detail of the separator plate 1 in a perspective view, specifically a section of the second ring area 20 with sections of the adjoining first and third ring area 10 and 30, respectively. On the underside of a spoke 21, an injection nozzle 80 of an injection mold is sketched (shown as a truncated cone in a schematically simplified manner; see also FIG. 3). The flattened peak of the truncated cone consequently defines a sprue location. In this example, the flattened peak starts on the underside of the separator plate 1, more precisely on a spoke 21 (that is, in the second ring area 20). In the sense of the above description, the spoke 21 is therefore a spoke 21 close to the sprue. The flattened peak could, however, also start on the top side and/or in the first area 10.

The spoke 21 in the vicinity of the sprue has an area 23 with a tapered cross-sectional area. In manufacturing, this area is realized by a projection of the injection mold. The plastic melt can therefore not only flow radially outward exclusively from the sprue location via the spoke 21 close to the sprue, but will flow outward via the first area 10 (i.e. the corresponding cavity of the injection mold) via other spokes 21 (i.e. also via spokes 21 remote from the sprue). As a result, the flow front is evened during the injection molding of the third ring area 30, such that it can be manufactured with a reduced wall thickness.

The ring 35 is attached to the spokes 21 radially on the corresponding outer ends. According to the above classification, the ring 35 is part of the third ring region 30. In comparison to the flat parts of the third ring region 30, the ring 35 has a greater material thickness, accordingly the corresponding ring channel of the injection mold having a larger free cross-section. In operation of the separator ring 1, the plastic melt can therefore evenly distribute in the peripheral direction, before it enters the annular gap to form the conically-surfaced section 31 of the third annular region 30.

In the area of the webs 40, the injection mold has a radial channel which counteracts a uniform expansion of the plastic melt, because the plastic melt would spread more quickly in this channel. In addition, at least part of the plastic melt shoots into the webs 40 (more precisely the corresponding recess) located in the radial extension of the spokes 21. An optional cross-sectional tapering 43 of profiles of the webs 40 at their inlet-sided end region can counteract an uneven expansion of the plastic melt during injection molding. The first quarter (preferably first fifth, even more preferred first eighth or first tenth of the corresponding web 40), which lies inwardly with respect to (the closest to) the axis of rotation 2, is herein referred to as the inlet-sided end region.

The optional intermediate webs 50 also contribute to evening the spread of the plastic melt, since the injection mold forms a channel with an enlarged cross-section at the corresponding location. This channel lies precisely in the area that is furthest away from the webs 40 (cf. FIGS. 1 to 3) and thus prevents a weld line that would otherwise be expected there. It can be clearly seen in FIGS. 2 and 3 that the intermediate webs 50 are shown wider than the webs 40 (that is, a cross-sectional area of the web 50 at a given radius of the plate 1 is larger than a cross sections area of any of webs 40 at the same radius) in order to compensate for the pressure drop in the injection mold by means of a larger flow cross-section. The height h (thickness) of the webs 40 and preferably also of the intermediate webs 50 is preferably at least approximately the same (with the value deviating within about ±10% from the nominal value) and at least approximately the same (±10%) over the distance from the axis of rotation 2 (with the exception of the cross-sectionally tapered areas 43). The indication "(±10%)" is intended to clarify that "at least approximately or at least substantially the same" means equal to as well as deviations from the mean value of up to 10% of the mean value. Smaller deviations of up to ±5%, up to ±2.5% or up to 1% are increasingly preferred with decreasing size.

As shown, it is advantageous if the cross-sectional area of the webs 40 and/or of the intermediate webs 50 tapers in radial direction, in order to reduce the pressure drop in the channels forming the later webs 40 or intermediate webs to be reduced, such that a flow front that is generated as uniform as possible over the periphery. The separator plate is therefore less prone to weld lines.

Figure 4:
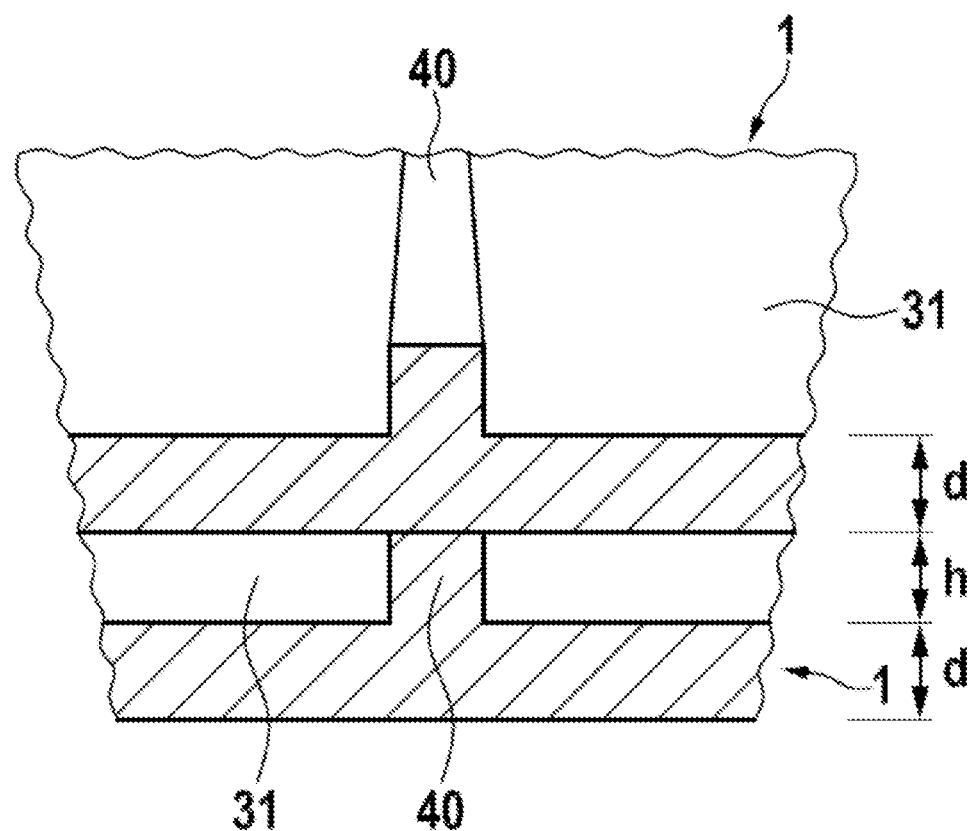
FIG. 4 depicts a portion of a cross-sectional view of two stacked upon one another separator plates, each structured according to an embodiment of FIGS. 1 to 3.

FIG. 4 shows a cross-section which was placed along a circular cylinder surface around the axis of rotation in the third ring area, with the viewing direction radially outwards. The thickened portion of the radially outwardly tapering webs with the height h on the surface 31 ascending conically outwards with a wall thickness d can be clearly seen. In this embodiment, the web height h defines the distance between two adjacent separator plates.

Figure 3:
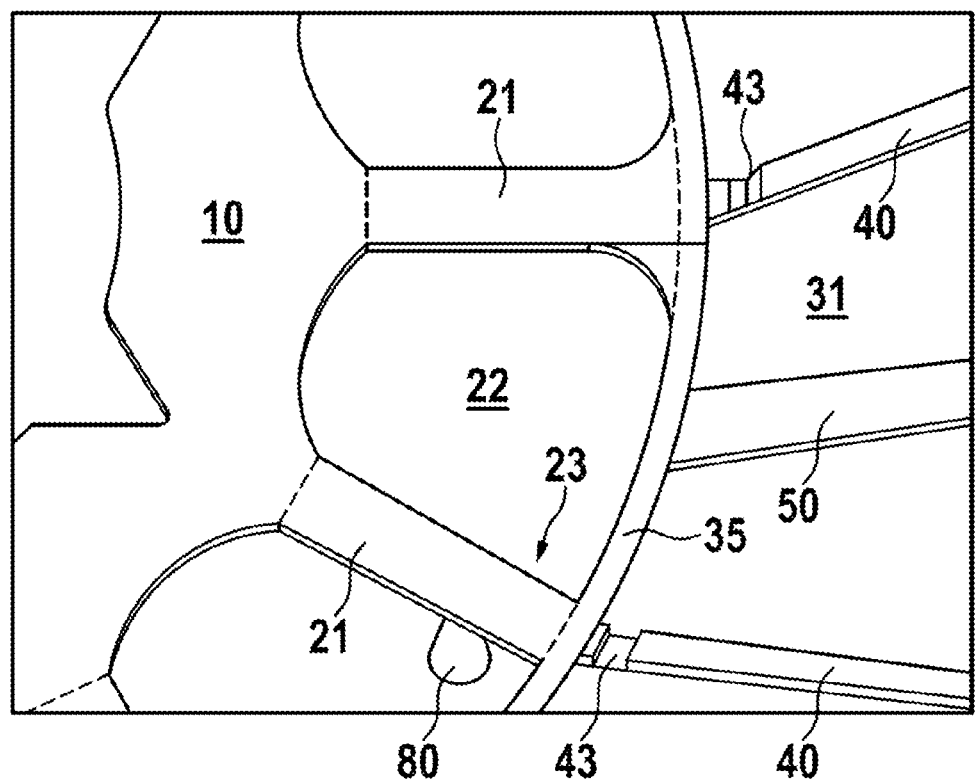
FIG. 3 shows a further detail of the separator plate.
Figure 5:
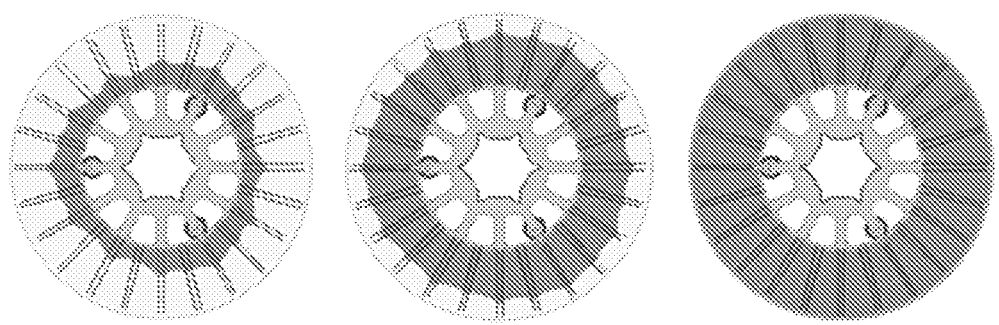
FIG. 5 shows in a sequence of images representing the result of a simulation of filling an injection mold for an embodiment of a separator plate.

FIG. 5 shows a sequence of images of a simulation of the spread of a plastic melt during the manufacturing of the separator plate shown in FIGS. 1 to 3. As can be clearly seen, the flow front of the plastic mass spreads in a very short time, almost rotationally symmetrical. The tendency to form weld lines is therefore very low. Correspondingly, the wall thickness d in the areas 31 can be particularly small.

Figure 6:
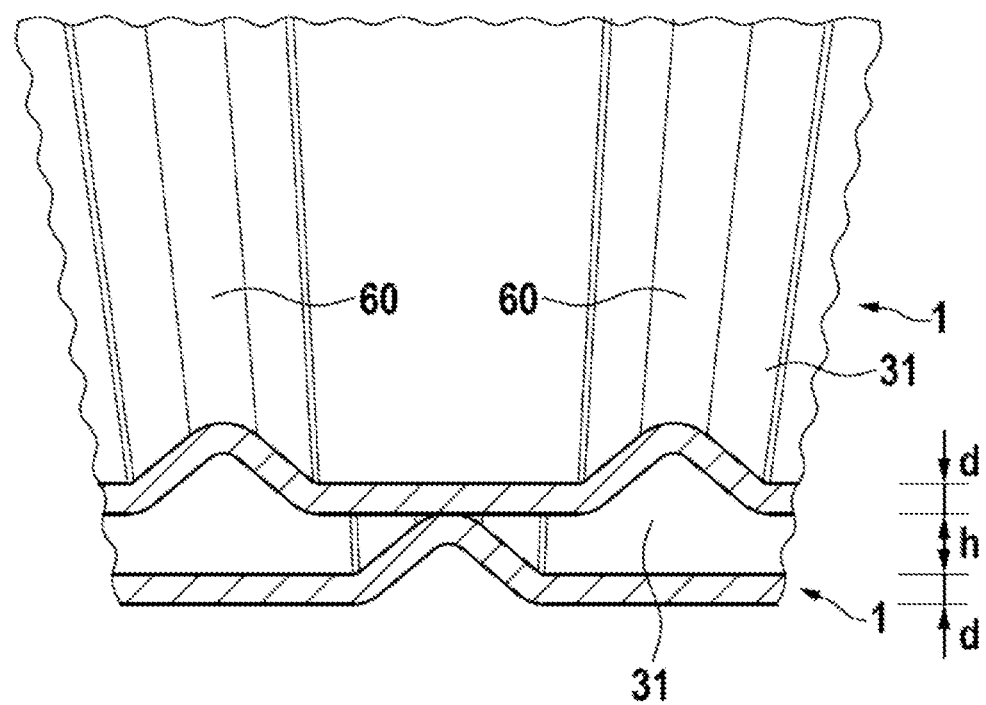
FIG. 6 provides a detail of a related cooperation of two separator plates.

FIG. 6 shows an alternative for the formation of spacers on separator plates 1; the view corresponds to that in FIG. 4. However instead of webs 40, undulations 60 in the third ring area 30 serve are formed (as seen downwards along the axis of rotation 2, these undulations 60 are perceived as ribs or ridges). When viewed from below the separator plate 1 (that is upward along the axis of rotation, the undulations 60 are perceived as grooves in the lower surface of the plate 1. As seen in FIG. 6, the ridges or ribs 60 are configured as spacers providing spatial separation h (defined by the height of a given ridge 60) between the two separator plates 1 stacked on the same shaft as long as ridges 60 of one of the plates are not co-located with the ridges of another of the plates (that is, as long as one of the stacked plates is rotates about the axis of rotation relative to another plate 1 as indicated. As seen from the bottom of a given separator plate 1, the ridges 60 correspond to respective grooves 60. The ridges 60 have the advantage, when compared to the webs 40, that the corresponding injection mold has no areas in which the gap thickness increases (at least significantly). The cross-sectional taperings 43 described above with reference to the webs 40 can therefore be formed smaller on the input side of the ridges 60 or even be omitted entirely. As can be seen, the wall thickness d of the separator plates 1 of the embodiment of FIG. 6 remains substantially (±10%) constant over the entire circumference, i.e. the thickness of the wall thickness of the area 30 at the ridge 60 (as viewed along the axis of rotation) is the same as the thickness of the wall of the area 30 between the ridges 60. Moreover, the ridges 60 are arranged like the webs 40 and/or intermediate webs 50 described above, i.e. they preferably extend at least approximately radially, wherein deviations of ±30° from the respective radial are permissible.

Figure 7:
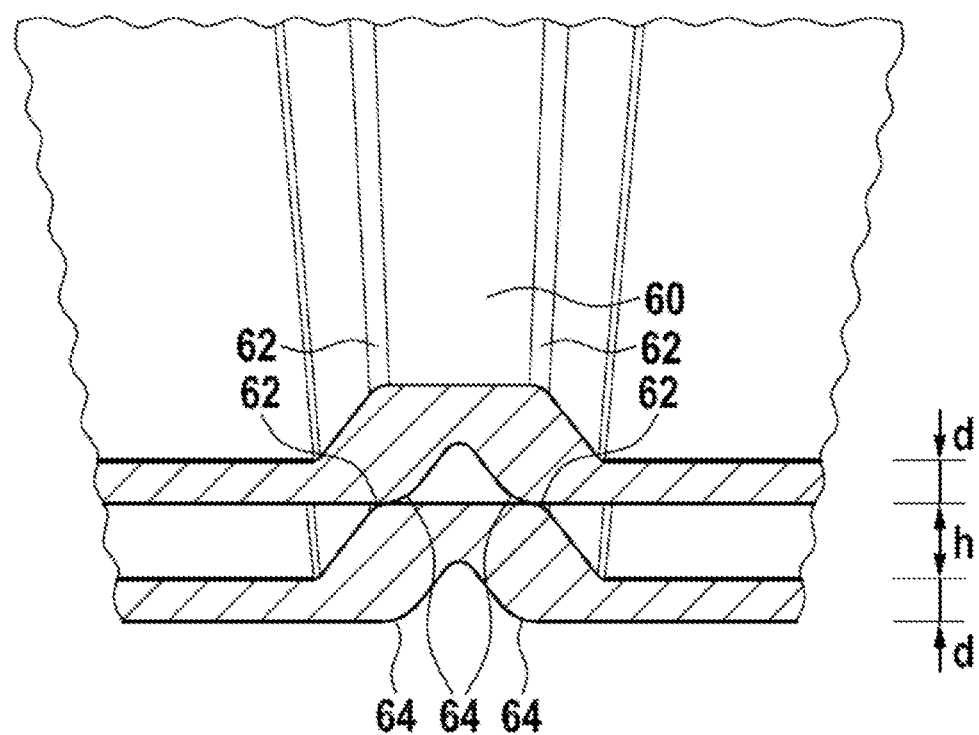
FIG. 7 shows a detail of yet another related cooperation of two separator plates with one another.

FIG. 7 shows a related alternative with slightly modified configuration of ridges 60, which configuration prevent ridges 60 stacked on one another from sinking into one another. This is achieved by the fact that the distance between the upper edges 62 of a ridge 60 is greater than the distance between corresponding lower edges 64, wherein the edges 62, 64 are shown rounded in the sketch. In contrast to what is shown in FIG. 6, the contour of the top side of a ridge 60 is not congruent with the contour of the corresponding underside (groove) of the ridge 60. If, as shown in FIG. 7, two similar separator plates 1 are stacked on top of one another, a distance h defined by the height of a given ridge 60 is consequently established between adjacent separator plates 1. In contradistinction with the embodiment of FIG. 6, the thickness of a wall of the area 30 at the ridge 60 in the embodiment of FIG. 7 differs from the thickness of the wall of the area 30 outside of the ridge 60. In this embodiment, it is therefore only important that the bearing surface generated by the ridge 60 on one side is wider than the recess formed on the other side of the ridge 60.

It will be appreciated to those skilled in the art having the benefit of this disclosure that this invention is believed to provide a separator plate and an oil mist separator. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 separator plate
2 axis of rotation
3 receptacle for shaft
10 first ring area
20 second ring area
21 spoke
22 openings between adjacent spokes
23 area of a spoke with a tapered cross-sectional area
30 third ring area
31 conical surface (conical section of the third ring area)
35 ring
40 webs
43 cross-sectional taper of a web
50 intermediate webs
60 ridge or rib
62 upper edges of the ridge or rib
64 lower edges of the ridge or rib
80 injector nozzle
99 edge of the separator plate

The invention claimed is:

1. A separator plate having an axis of rotation thereof and comprising a receptacle configured to accept a drive shaft along the axis of rotation, and further comprising a first ring area radially adjoining the receptacle,
a second ring area radially adjoining the first ring area, and
a third ring area radially adjoining the second ring area, wherein the second ring area contains multiple spokes that connect the first and third ring areas to one another to form axially extending flow channels between the spokes,
wherein the separator plate has at least two sprues arranged rotationally symmetrically with respect to the axis of rotation, and
wherein the spokes that are adjacent to a sprue location have at least one section with a tapered cross-sectional area, wherein the cross-sectional area is an area of a circular cylinder around the axis of rotation, and wherein the at least one section with the tapered cross-sectional area is farther away from the axis of rotation than the sprue location.

2. A separator plate according to claim 1, wherein a material of the separator plate is a partially aromatic polyamide.

3. A separator plate according to claim 1, comprising at least one web adjoining at least one spoke along a radial direction of the plate, wherein the at least one web is configured as a thickened portion of a wall of a conical section of the third ring area.

4. A separator plate according to claim 3, wherein each of at least two adjacent spokes is adjoined in the radial direction by a corresponding web of the at least one web, and further comprising at least one intermediate web disposed between such corresponding webs.

5. A separator plate according to claim 3, wherein a cross-sectional area of the at least one web and/or a cross-sectional area of the at least one intermediate web is dimensionally tapered in the radial direction.

6. A separator plate according to claim 5, wherein the cross-sectional area of the at least one intermediate web at a given radius of the separator plate is greater than each of respective cross-sectional areas of the two webs immediately neighboring the at least one intermediate web at the same given radius.

7. A separator plate according to claim 3, wherein the at least one web that is not directly adjacent to the sprue location has a section in which a corresponding cross-sectional area of the at least one web, as seen along the radial direction, is initially reduced and then enlarged again.

8. A separator plate according to claim 4, wherein a thickness of a wall of the third ring area measured between two adjacent webs and/or between the at least one web and the at least one adjacent intermediate web along a circumference of the third ring area and/or measured in the radial direction is maintained within 10%.

9. A separator plate according to claim 1, comprising a ridge as seen along the axis of rotation, said ridge adjoining at least one spoke, of the multiple spokes, and extending in a radial direction along a conical section of the third ring area.

10. A separator plate according to claim 9, wherein the at least one web or the ridge has a height h measured perpendicularly to a surface of the conical section of the third ring area, said height h being less than or equal to 0.3 mm.

11. A stack of separator plates, wherein the stack of separator plates comprises at least one separator plate of claim 1.

12. A separator plate according to claim 9, wherein the at least one web the rib has a height h above the wall of the conical section, said height h being less than or equal to 0.2 mm.

13. A separator plate according to claim 9, wherein said ridge is formed on said conical section that has a wall of a substantially constant thickness.

\* \* \* \* \*